Patented June 9, 1953

2,641,606

UNITED STATES PATENT OFFICE 2,641,606

PROCESS FOR PRODUCTION OF TETRA ESTERS OF DIPHOSPHORIC ACID

Leonard W. Harris, Richmond, George R. Sanders, El Cerrito, and Carroll C. Cassil, Berkeley, Calif., assignors to California Spray-Chemical Corporation, Richmond, Calif., a corporation of Delaware No Drawing. Application November 29, 1946, Serial No. 713,116

4 Claims. (Cl. 260—461)

This invention relates to a method of making tetra esters of a diphosphoric acid and to compositions characterized by high concentration of such esters.

We have discovered a method whereby a composition containing 30 per cent or more by weight of such compounds can be produced simply and economically. We have further discovered a means whereby the said esters can be recovered from such compositions in a pure state. In addition, we have discovered that the tetra alkyl diphosphates in which the alkyl radical contains 1, 2 or 3 carbon atoms are exceedingly valuable for the control of many insect and rodent pests.

In order to carry out our invention and to produce the results stated above, we proceed as follows: To the desired aliphatic ester of phosphoric acid there is added, gradually, a phosphorus oxyhalogenide while holding the average temperature of the reactants in the range of 130 to 135° C. The reaction is somewhat exothermic and therefore care is taken to avoid a temperature rise materially above 135° C. It is important that the total quantity of phosphorus oxyhalogenide added be not less than 1 mol thereof to 7 mols of aliphatic phosphoric ester, and not more than 1 mol of phosphorus oxyhalogenide to 4 mols of aliphatic phosphoric acid ester. If the average temperature during the reaction is permitted to fall materially below 130° C., the desired reaction proceeds at an unreasonably slow rate and may, if the temperature is much below this point, not go to completion. On the other hand, an average temperature above 135° C. results in a seriously decreased yield of the desired esters, either because of their tendency to decompose at such higher temperatures or because such higher temperatures favor other reactions. Likewise, we have found that the molar ratio of reactants as specified above is critical. The amount of tetra alkyl diphosphate produced, even under optimum temperature conditions, is low at molar ratios of phosphorus oxyhalogenide less than 1 to 7, but rises rapidly as the ratio increases above 1 to 7. When the ratio reaches 1 to 6 and 1 to 5, the yield of tetra alkyl diphosphate reaches its peak, but after a ratio of 1 to 4 is exceeded, the yield drops precipitantly.

The following is an example of an embodiment of our invention as it is carried out in commercial practice: The apparatus consists of a kettle equipped with a refluxing condenser, motor driven stirring means, and heat control means such as a steam coil. A given quantity of triethyl phosphate, $PO(C_2H_5O)_3$, is introduced into the kettle and heated to about 130° C. When this temperature is reached, the introduction of phosphorus oxychloride, $POCl_3$, is started and is carried out at such a rate as to maintain a reaction temperature within the range 130 to 135° C. The contents of the kettle are kept in a state of agitation throughout the reaction. In conformity with the requirements of this temperature regulation, phosphorus oxychloride is added until a total of 1 mol thereof for each 5 to 6 mols of triethyl phosphate has been added. During the course of this procedure, ethyl chloride is evolved and either recovered in the condenser or allowed to escape to the atmosphere. When the specified amount of phosphorus oxychloride has been added and the evolution of ethyl chloride ceases, (in large plant equipment this point may be reached in 2 to 3 hours) the reaction product remaining in the kettle is cooled to about atmospheric temperature and removed from the kettle as an oily liquid.

The product of the reaction described above is found to contain about 45 per cent by weight of tetra ethyl diphosphate, the remainder being high molecular weight phosphorus reaction products and a considerable amount of unreacted triethyl phosphate.

Although a product containing the maximum concentration of tetra ethyl diphosphate is obtained when, as stated above, 5 to 6 mols of aliphatic ester of phosphoric acid is employed per mol of phosphorus oxyhalogenide, we have found that a product containing upwards of 30 per cent of the desired tetra ethyl diphosphate can be obtained by the use of not less than 4 mols and not more than 7 mols of aliphatic ester of phosphoric acid are used per mol of phosphorus oxyhalogenide.

The product obtained by the use of our method as described above when applied to the ethyl compound is a somewhat oily liquid mixture of phosphates including triethyl phosphate and 30 to 45 per cent by weight of tetra ethyl diphosphate. The refractive index of such reaction product is from 1.4150 to 1.4210 at 22° C. It is soluble in water (with decomposition) and in chloroform, ketones and alcohols. It is insoluble in petroleum solvents. It may be used directly as such for the formulation of insecticidal and rodenticidal compositions. Measurement of insecticidal potency under standardized conditions (Hoskins Chamber technique on *Musca domestica* described in "Chemical Control of Insects" edited by Campbell & Moulton, 1943, at page 130) in .05 per cent concentration show it to equal or exceed that of "D. D. T." (dichloro diphenyl trichloroethane).

We have further discovered a means whereby the tetra alkyl diphosphate may be recovered from the reaction product described above. This recovery is effected by exposing the reaction product to elevated temperature for a very short time in a thin film at an absolute pressure of the order of 1 to 2 microns Hg, placing a cool surface near the said film, and collecting the liquid which condenses on such cool surface. In the case of the reaction product containing tetra ethyl diphosphate we find that best results are obtained when the film of reaction product is heated to 100–120° C., and preferably to about 110° C. When this is done, the first fraction or fractions so collected are found to contain a considerable amount of triethyl phosphate, but when the triethyl phosphate has been thus removed from the reaction product the subsequent fractions consist of substantially pure tetra ethyl diphosphate. Alternatively, the triethyl phosphate may first be removed by exposure to a lower temperature of the order of 60° C., whereupon the film temperature may be raised to 100–120° C. as stated, and the tetra ethyl compound may then be recovered.

The material remaining after recovery of the tetra ethyl diphosphate is found to have a molecular weight much higher than that of the said ester, and is found to possess little or no insecticidal potency.

It will thus be seen that by carrying out the process as described above, we are able to obtain a mixed phosphate composition containing from 30 to 45 per cent by weight of tetra ethyl diphosphate. We are further able to separate from such composition a material having any desired higher concentration of tetra ethyl diphosphate.

Tetra ethyl diphosphate, molecular weight about 306, has a density of 1.1983 at 20° C. and a refractive index of approximately 1.4190 at 22.5° C. It decomposes rapidly at 150° C., even under vacuum.

We have found that the above-described ethyl ester is extraordinarily toxic to animals and insects, but that it decomposes rapidly upon exposure to the atmosphere, and therefore is relatively safe for insecticidal and rodenticidal use. We have also found that the corresponding methyl, propyl and isopropyl esters may be made and recovered in the same manner as described fully above for the ethyl ester, and that these esters are likewise valuable toxic agents. It is necessary, of course, when preparing the methyl ester, to make use of trimethyl phosphate instead of triethyl phosphate as described in the foregoing example. Analogously, the tripropyl or triisopropyl phosphates are used when those esters are desired.

We claim:

1. A process of preparing tetra-alkyl diphosphates which comprises intimately reacting a phosphorus oxyhalogenide with a trialkyl phosphate in which the alkyl radicals contain from 1 to 3 carbon atoms in a molar ratio of one mol of the former to from 4 to 7 mols of the latter at a reaction temperature of at least 130° C. and below the decomposition temperature of the resulting tetra-alkyl diphosphate.

2. A process of preparing tetra-alkyl diphosphates which comprises intimately reacting a phosphorus oxychloride with a tri-alkyl phosphate in which the alkyl radical contains from 1 to 3 carbon atoms in a molar ratio of one mol of the former to from 4 to 7 mols of the latter at a reaction temperature of at least 130° C. and below the decomposition temperature of the resulting tetra-alkyl diphosphate.

3. A process of preparing tetra-ethyl diphosphates which comprises intimately reacting a phosphorus oxychloride with a tri-ethyl phosphate in a molar ratio of one mol of the former to from 4 to 7 mols of the latter at a reaction temperature of at least 130° C. and below the decomposition temperature of the resulting tetra-ethyl diphosphate.

4. The process which comprises reacting together at a temperature at which ethyl chloride is formed, triethyl phosphate and phosphorus oxychloride in the molecular ratio of substantially 5 mols of the former to 1 mol of the latter.

LEONARD W. HARRIS.
GEORGE R. SANDERS.
CARROLL C. CASSIL.

References Cited in the file of this patent

UNITED STATES PATENTS

| Number | Name | Date |
|---|---|---|
| 2,336,302 | Schrader | Dec. 7, 1943 |
| 2,402,703 | Woodstock | June 25, 1946 |

OTHER REFERENCES

Hall et al., "Ind. and Eng. Chem.," vol. 40 (April 1948), pp. 694–699.